United States Patent
Bashar et al.

(10) Patent No.: US 9,503,892 B2
(45) Date of Patent: Nov. 22, 2016

(54) MAPPING SPECIAL SUBFRAMES IN A WIRELESS COMMUNICATION NETWORK

(71) Applicant: INTEL IP CORPORATION, Santa Clara, CA (US)

(72) Inventors: Shafi Bashar, Santa Clara, CA (US); Seunghee Han, Kyoungkido (KR); Hong He, Beijing (CN); Jong-Kae Fwu, Sunnyvale, CA (US); Alexei Davydov, Niz (RU)

(73) Assignee: Intel IP Corporation, Santa Clara, CA (US)

( * ) Notice: Subject to any disclaimer, the term of this patent is extended or adjusted under 35 U.S.C. 154(b) by 180 days.

(21) Appl. No.: 14/127,891

(22) PCT Filed: Sep. 17, 2013

(86) PCT No.: PCT/US2013/060201
§ 371 (c)(1),
(2) Date: Dec. 19, 2013

(87) PCT Pub. No.: WO2014/113078
PCT Pub. Date: Jul. 24, 2014

(65) Prior Publication Data
US 2015/0009870 A1    Jan. 8, 2015

Related U.S. Application Data

(60) Provisional application No. 61/753,914, filed on Jan. 17, 2013.

(51) Int. Cl.
H04W 72/00    (2009.01)
H04W 12/04    (2009.01)
(Continued)

(52) U.S. Cl.
CPC ............ *H04W 12/04* (2013.01); *H04B 7/0417* (2013.01); *H04B 7/0456* (2013.01); *H04J 3/00* (2013.01);
(Continued)

(58) Field of Classification Search
CPC . H04L 5/0051; H04L 1/1812; H04L 5/0057; H04L 5/0062; H04L 5/14; H04L 5/1469; H04L 5/22; H04L 9/14; H04L 63/30; H04L 65/1006; H04L 65/4076; H04L 65/602; H04L 65/608; H04L 65/80; H04L 67/02; H04W 48/20; H04W 72/1278; H04B 7/0417; H04B 7/0456
See application file for complete search history.

(56) References Cited

U.S. PATENT DOCUMENTS

2010/0238845 A1* 9/2010 Love ................. H04B 7/15528
370/280
2011/0085519 A1* 4/2011 Koivisto ................ H04J 13/00
370/335

(Continued)

FOREIGN PATENT DOCUMENTS

KR    10-2012-0015927 A    2/2012

OTHER PUBLICATIONS

International Search Report and Written Opinion for PCT Application No. PCT/US2013/060201, dated Dec. 27, 2013, 14 pages.
(Continued)

*Primary Examiner* — Curtis A Alia
(74) *Attorney, Agent, or Firm* — Schwabe, Williamson & Wyatt, P.C.

(57) ABSTRACT

Methods, apparatuses, and systems are described related to mapping special subframes in a wireless communication network. In embodiments, an eNB may assign demodulation reference signals (DM-RSs) and/or cell-specific reference signals (CRSs) to a downlink pilot time slot (DwPTS) of a special subframe responsive to a determined configuration of the special subframe. In embodiments, an eNB may bundle the DwPTS or an uplink pilot time slot (UpPTS) of the special subframe with another subframe for scheduling. In embodiments, a UE may estimate a channel associated with the special subframe based on DM-RSs and/or CRSs transmitted in another subframe. In embodiments, an eNB may exclude the DwPTS from scheduling for certain special subframe configurations if a new carrier type (NCT) is used. In embodiments, an eNB may exclude certain special subframe configurations from use for NCT communications. Other embodiments may be described and claimed.

15 Claims, 9 Drawing Sheets

(51) Int. Cl.
| | |
|---|---|
| H04L 5/00 | (2006.01) |
| H04B 7/04 | (2006.01) |
| H04W 72/02 | (2009.01) |
| H04L 29/06 | (2006.01) |
| H04L 29/08 | (2006.01) |
| H04W 36/22 | (2009.01) |
| H04W 76/04 | (2009.01) |
| H04W 16/32 | (2009.01) |
| H04W 48/16 | (2009.01) |
| H04W 72/04 | (2009.01) |
| H04W 56/00 | (2009.01) |
| H04L 5/22 | (2006.01) |
| H04J 3/00 | (2006.01) |
| H04W 74/00 | (2009.01) |
| H04W 72/12 | (2009.01) |
| H04W 28/02 | (2009.01) |
| H04W 52/02 | (2009.01) |
| H04W 76/02 | (2009.01) |
| H04W 48/20 | (2009.01) |
| H04W 24/02 | (2009.01) |
| H04W 24/10 | (2009.01) |
| H04L 1/18 | (2006.01) |
| H04L 5/14 | (2006.01) |
| H04L 9/14 | (2006.01) |
| H04W 8/00 | (2009.01) |
| H04W 68/02 | (2009.01) |
| H04W 4/06 | (2009.01) |
| H04W 48/08 | (2009.01) |
| H04W 88/06 | (2009.01) |
| H04W 84/12 | (2009.01) |

(52) U.S. Cl.
CPC ........... *H04L 1/1812* (2013.01); *H04L 1/1887* (2013.01); *H04L 5/0051* (2013.01); *H04L 5/0055* (2013.01); *H04L 5/0057* (2013.01); *H04L 5/0062* (2013.01); *H04L 5/14* (2013.01); *H04L 5/1469* (2013.01); *H04L 5/22* (2013.01); *H04L 9/14* (2013.01); *H04L 63/0428* (2013.01); *H04L 63/30* (2013.01); *H04L 65/1006* (2013.01); *H04L 65/4076* (2013.01); *H04L 65/602* (2013.01); *H04L 65/608* (2013.01); *H04L 65/80* (2013.01); *H04L 67/02* (2013.01); *H04W 4/06* (2013.01); *H04W 8/005* (2013.01); *H04W 16/32* (2013.01); *H04W 24/02* (2013.01); *H04W 24/10* (2013.01); *H04W 28/0231* (2013.01); *H04W 36/22* (2013.01); *H04W 48/08* (2013.01); *H04W 48/16* (2013.01); *H04W 48/20* (2013.01); *H04W 52/0251* (2013.01); *H04W 56/001* (2013.01); *H04W 68/02* (2013.01); *H04W 72/00* (2013.01); *H04W 72/02* (2013.01); *H04W 72/042* (2013.01); *H04W 72/0406* (2013.01); *H04W 72/046* (2013.01); *H04W 72/0413* (2013.01); *H04W 72/12* (2013.01); *H04W 72/1205* (2013.01); *H04W 72/1263* (2013.01); *H04W 72/1278* (2013.01); *H04W 74/00* (2013.01); *H04W 76/021* (2013.01); *H04W 76/023* (2013.01); *H04W 76/046* (2013.01); *H04W 76/048* (2013.01); *H04W 88/06* (2013.01); *H04L 2209/24* (2013.01); *H04L 2209/80* (2013.01); *H04W 84/12* (2013.01)

(56) References Cited

U.S. PATENT DOCUMENTS

| | | | |
|---|---|---|---|
| 2011/0170562 A1* | 7/2011 | Hu et al. | 370/479 |
| 2012/0155338 A1* | 6/2012 | Noh et al. | 370/280 |
| 2012/0163335 A1* | 6/2012 | Chung et al. | 370/330 |
| 2012/0257553 A1 | 10/2012 | Noh et al. | |
| 2012/0269151 A1 | 10/2012 | Lee, II et al. | |
| 2012/0294207 A1* | 11/2012 | Ahn et al. | 370/280 |
| 2013/0194980 A1* | 8/2013 | Yin | H04L 1/1854 370/280 |

OTHER PUBLICATIONS

International Preliminary Report on Patentability for PCT Application No. PCT/US2013/080201, dated Jul. 30, 2015, 11 pages.

\* cited by examiner

MAPPING SPECIAL SUBFRAMES IN A WIRELESS COMMUNICATION NETWORK

CROSS REFERENCE TO RELATED APPLICATIONS

The present application is a national phase entry under 35 U.S.C. §371 of International Application No. PCT/US2013/060201, filed Sep. 17, 2013, entitled "MAPPING SPECIAL SUBFRAMES IN A WIRELESS COMMUNICATION NETWORK", which designates the United States of America, and which claims priority to U.S. Provisional Patent Application No. 61/753,914, filed Jan. 17, 2013, entitled "Advanced Wireless Communication Systems and Techniques," the entire disclosure of which is hereby incorporated by reference in its entirety.

FIELD

Embodiments of the present invention relate generally to wireless communication networks and more particularly to mapping special subframes in wireless communication networks.

BACKGROUND

In Long Term Evolution Advanced (LTE-A) wireless networks, a radio frame includes a special subframe to transition from a downlink subframe to an uplink subframe. The special subframe includes a downlink pilot time slot (DwPTS) and an uplink pilot time slot (UpPTS) separated by a guard period. The special subframe may have one of a plurality of configurations. However, in some configurations, no demodulation reference signals (DM-RS) are assigned in the DwPTS of the special subframe.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Illustrative embodiments of the present disclosure include, but are not limited to, methods, systems, computer-readable media, and apparatuses for mapping special subframes in a wireless communication system.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in some embodiments" is used repeatedly. The phrase generally does not refer to the same embodiments; however, it may. The terms "comprising," "having," and "including" are synonymous, unless the context dictates otherwise.

The phrase "A and/or B" means (A), (B), or (A and B). The phrases "A/B" and "A or B" mean (A), (B), or (A and B), similar to the phrase "A and/or B."

As used herein, the term "circuitry" refers to, is part of, or includes hardware components such as an Application Specific Integrated Circuit (ASIC), an electronic circuit, a logic circuit, a processor (shared, dedicated, or group) and/or memory (shared, dedicated, or group) that are configured to provide the described functionality. In some embodiments, the circuitry may execute one or more software or firmware programs to provide at least some of the described functionality.

Figure 1:
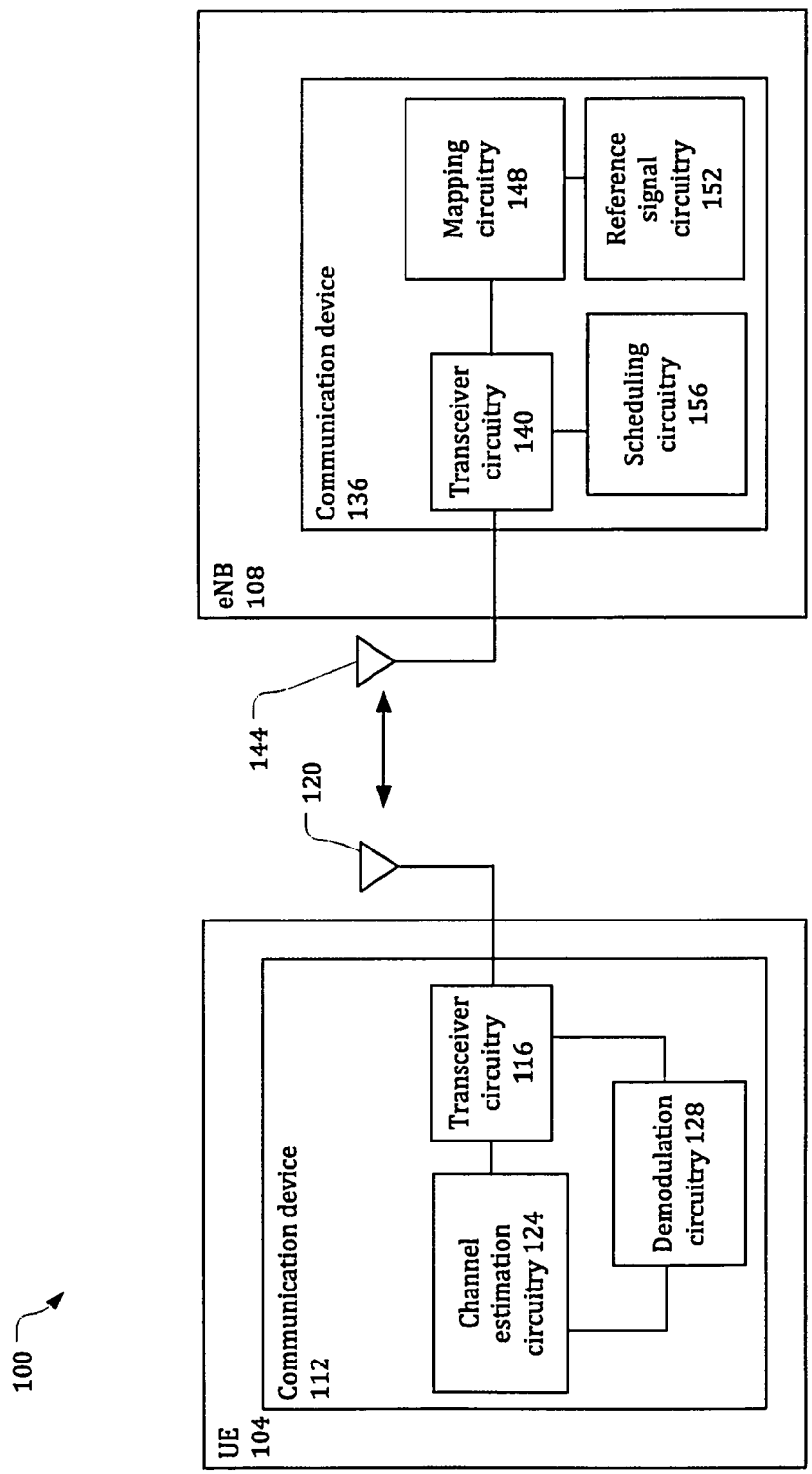
FIG. 1 schematically illustrates a high-level example of a network system comprising a user equipment (UE) and an evolved Node B (eNB), in accordance with various embodiments.

FIG. 1 schematically illustrates a network environment 100 in accordance with various embodiments. The network environment 100 includes a user equipment (UE) 104 wirelessly coupled with an evolved Node B (eNB) 108 of a radio access network (RAN) via an over-the-air (OTA) interface. The RAN may be part of a 3GPP LTE Advanced (LTE-A) network and may be referred to as an evolved universal terrestrial radio access network (EUTRAN). In other embodiments, other radio access network technologies may be utilized.

The UE 104 may include a communication device 112 that implements various communication protocols in order to effectuate communication with the eNB 108. The communication device 112 may be a chip, chipset, or other collection of programmed and/or preconfigured circuitry. In some embodiments, the communication device 112 may include or be part of baseband circuitry, radio-frequency circuitry, etc.

The communication device 112 may include transceiver circuitry 116 to wirelessly communicate with the eNB 108 over a wireless communication network (e.g., the RAN). The transceiver circuitry 116 may be coupled with one or more antennas 120 of the UE 104 to transmit wireless signals to, and/or receive wireless signals from, the eNB 108.

The communication device 112 may further include channel estimation circuitry 124 and demodulation circuitry 128. The channel estimation circuitry 124 may estimate a channel between the UE 104 and the eNB 108. The demodulation circuitry 128 may use the estimated channel to demodulate signals received by the UE 104 from the eNB 108.

The eNB 108 may include a communication device 136 that implements various communication protocols in order to effectuate communication with the UE 104. The communication device 136 may be a chip, chipset, or other collection of programmed and/or preconfigured circuitry. In some embodiments, the communication device 136 may include or be part of baseband circuitry, radio-frequency circuitry, etc.

The communication device 136 may include transceiver circuitry 140 to wirelessly communicate with the UE 104. The transceiver circuitry 140 may be coupled with one or more antennas 144 of the eNB 108 to transmit wireless signals to, and/or receive wireless signals from, the UE 104. The communication device 136 may further include mapping circuitry 148, reference signal circuitry 152, and/or scheduling circuitry 156.

It will be appreciated that the connections between the circuitry of the communication device 112 and communication device 136 shown in FIG. 1 are presented as an example, and some embodiments may include fewer, additional, and/or different connections between the circuitry of communication device 112 and/or the circuitry of communication device 136.

Figure 2:
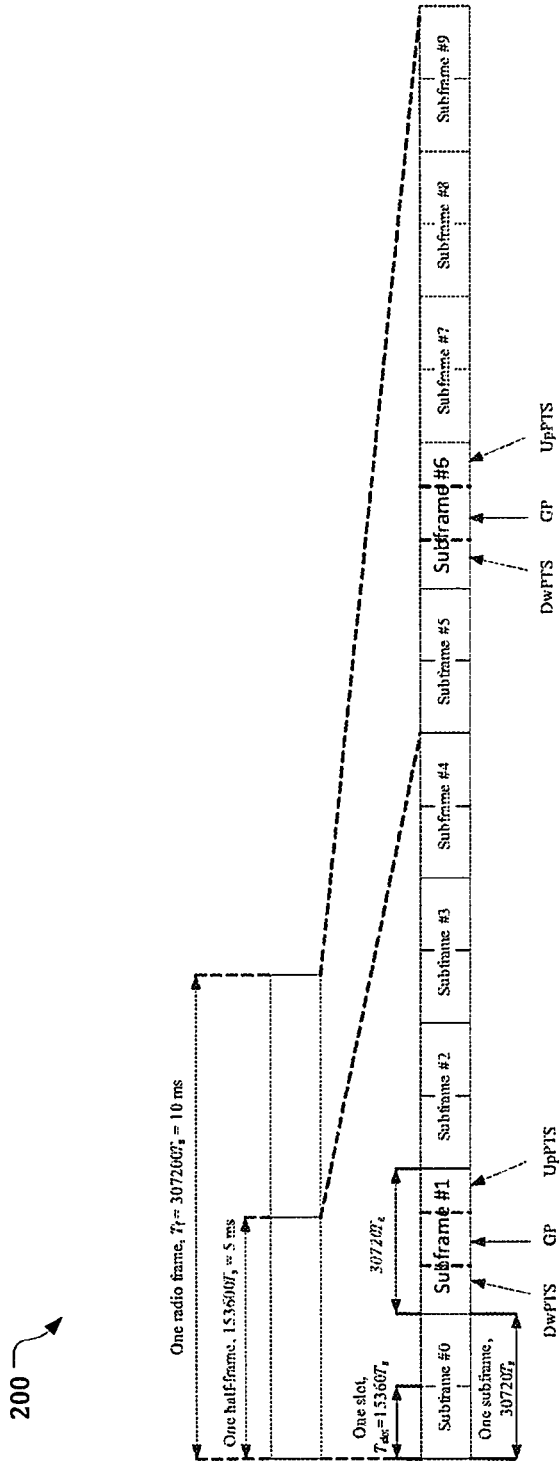
FIG. 2 schematically illustrates a radio frame in accordance with various embodiments.

In various embodiments, the UE 104 may communicate with the eNB 108 in a time domain duplexing (TDD) radio frame. The TDD radio frame may include a plurality of subframes that are ordered in the time domain. FIG. 2 illustrates a TDD radio frame 200 in accordance with various embodiments. Radio frame 200 may include a plurality of subframes that follow one another in the time domain.

The subframes 204 may have indices that increase with time. For example, the radio frame 200 in FIG. 2 is shown with ten subframes, including subframe 0 to subframe 9. In some embodiments, the radio frame 200 may have a length (e.g., duration) of 10 ms, and each subframe may have a length of 1 ms. Each subframe may include two slots in the time domain, and each slot may have a length equal to a length of one physical resource block (PRB). Thus, one subframe may include one PRB pair in the time domain. The PRB pair of each subframe may include a plurality of physical resource elements arranged in the time and frequency domains.

In various embodiments, the subframes of radio frame 200 may include downlink subframes that are designated for downlink transmission to the UE 104 from the eNB 108 and uplink subframes that are designated for uplink transmission from the UE 104 to the eNB 108. Additionally, the radio frame 200 may include one or more special subframes. For example, in radio frame 200 shown in FIG. 2, subframe 1 and subframe 6 are special subframes. The special subframes may include a downlink pilot time slot (DwPTS) and an uplink pilot time slot (UpPTS) separated by a guard period. Thus, the special subframes may transition from downlink communication to uplink communication. The subframe immediately preceding the special subframe may be a downlink subframe, while the subframe immediately following the special subframe may be an uplink subframe. For example, subframe 0 may be a downlink subframe, subframe 1 may be a special subframe, and subframe 2 may be an uplink subframe.

In some embodiments, the radio frame 200 may include two special subframes (e.g., subframe 1 and subframe 6), as shown in FIG. 2. In other embodiments, the radio frame 200 may include only one special subframe or another suitable number of special subframes.

The special subframe may have one of a plurality of configurations. The configurations may differ in the lengths of the DwPTS, UpPTS, and/or guard period, and/or whether the special subframe uses a regular cyclic prefix or an extended cyclic prefix. In some embodiments, the configuration of the special subframe may be selected from a set of configurations as shown in Table 1:

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

Table 1 shows the lengths of the DwPTS and UpPTS for a plurality of special subframe configurations, including special subframe configurations 0 to 9 with a normal cyclic prefix in downlink, and special subframe configurations 0 to 7 with an extended cyclic prefix in the downlink. The lengths of the DwPTS and UpPTS are shown in units of $T_s$, which may be equal to $1/(15000 \times 2048)$ seconds in some embodiments.

In some embodiments, the eNB 108 may communicate with the UE 104 using a new carrier type (NCT). In NCT communications, a cell-specific reference signal (CRS) may be transmitted with a periodicity of greater than one subframe. Accordingly, the CRS may not be transmitted in every subframe 204 of the radio frame 200. For example, in some embodiments, the CRS may have a periodicity of 5 ms. Accordingly, the CRS may be transmitted every five subframes (e.g., subframe 0 and subframe 5).

In NCT communications, the CRS may be used for synchronization purposes and not for demodulation of signals received by the UE 104 from the eNB 108. Instead, a demodulation reference signal (DM-RS) may be transmitted by the eNB 108 in the radio frame 200 to facilitate demodulation. The UE 104 (e.g., demodulation circuitry 128) may use the DM-RS to demodulate signals received from the eNB 108, such as a physical downlink shared channel (PDSCH) transmission and/or a control channel (e.g., an enhanced physical downlink control channel (EPDCCH)) transmission.

However, in the Long Term Evolution Advanced (LTE-A) Release 11.3 standard, some of the special subframe configurations do not have DM-RS assigned for transmission within the special subframe. Specifically, special subframe configuration 0 and special subframe configuration 5 with a normal cyclic prefix, and special subframe configuration 0, special subframe configuration 4, and special subframe configuration 7 with an extended prefix do not have DM-RS assigned for transmission within the special subframe. Accordingly, the UE 104 may not be able to receive signals (e.g., control channels) within the DwPTS of these subframes.

The present disclosure provides several solutions to the issues discussed above with respect to the identified special subframes.

In some embodiments, the eNB 108 may transmit one or more DM-RSs in the DwPTS of a special subframe having a special subframe configuration of subframe configuration 0 with a normal cyclic prefix for downlink, special subframe configuration 5 with a normal cyclic prefix for downlink, special subframe configuration 0 with an extended cyclic prefix for downlink, special subframe configuration 4 with an extended cyclic prefix for downlink, or special subframe configuration 7 with an extended cyclic prefix for downlink. Special subframes with special subframe configuration 0 or 5 with an normal cyclic prefix for downlink, or special subframe configuration 0 or 4 with an extended cyclic prefix for downlink, may include a DwPTS with a length of three time-domain symbols (e.g., including symbols 0, 1, and 2). Special subframes with special subframe configuration 7 with an extended cyclic prefix may include a DwPTS with a length of five time-domain symbols (e.g., including symbols 0, 1, 2, 3, and 4). As shown in Table 1, the special subframe configurations 0 and 5 with a normal cyclic prefix, and special subframes 0, 4, and 7 with an extended cyclic prefix may all have a DwPTS with a length less than 420 microseconds. The special subframes may include a guard period that follows the DwPTS, and an UpPTS that follows the guard period.

In various embodiments, the reference signal circuitry 152 of the eNB 108 may generate one or more DM-RSs to facilitate the UE 104 to receive signals from the eNB 108. The mapping circuitry 148 may assign the DM-RSs to resource elements in the DwPTS of the special subframe. The transceiver circuitry 140 may transmit the DM-RSs to the UE 104 using the assigned resource elements. The transceiver 140 may transmit a PDSCH, PDCCH, and/or EPDCCH in the DwPTS of the special subframe. The demodulation circuitry 128 of the UE 104 may demodulate the transmission received from the eNB 108 using the DM-RSs.

For special subframe configurations 0 and 5 with a normal cyclic prefix in the downlink, in some embodiments the mapping circuitry 148 may assign the DM-RSs to resource elements in an earliest two time-domain symbols (e.g., symbols 0 and 1) of the DwPTS, and may not assign the DM-RSs to the third time-domain symbol (e.g., symbol 2). In some embodiments, a primary and secondary synchronization signal (PSS/SSS) sequence, including a primary synchronization signal (PSS) and/or a secondary synchronization signal (SSS), may be transmitted in symbol 2 in some special subframes. For example, the PSS/SSS sequence may be transmitted in symbol 2 of the special subframe for the center six PRBs in the frequency domain. Accordingly, assigning the DM-RSs to symbols 0 and 1 may avoid collision with the PSS/SSS.

For DM-RSs assigned to both symbol 0 and symbol 1, the DM-RSs may be transmitted using up to four antenna ports in special subframes with special subframe configuration 0 or 5 using the regular cyclic prefix. For example, the DM-RSs may be transmitted using antenna ports 7, 8, 9, and 10 to support transmission of a PDSCH, or using antenna ports 107, 108, 109, and 110 to support transmission of an EPDCCH.

Figure 3:
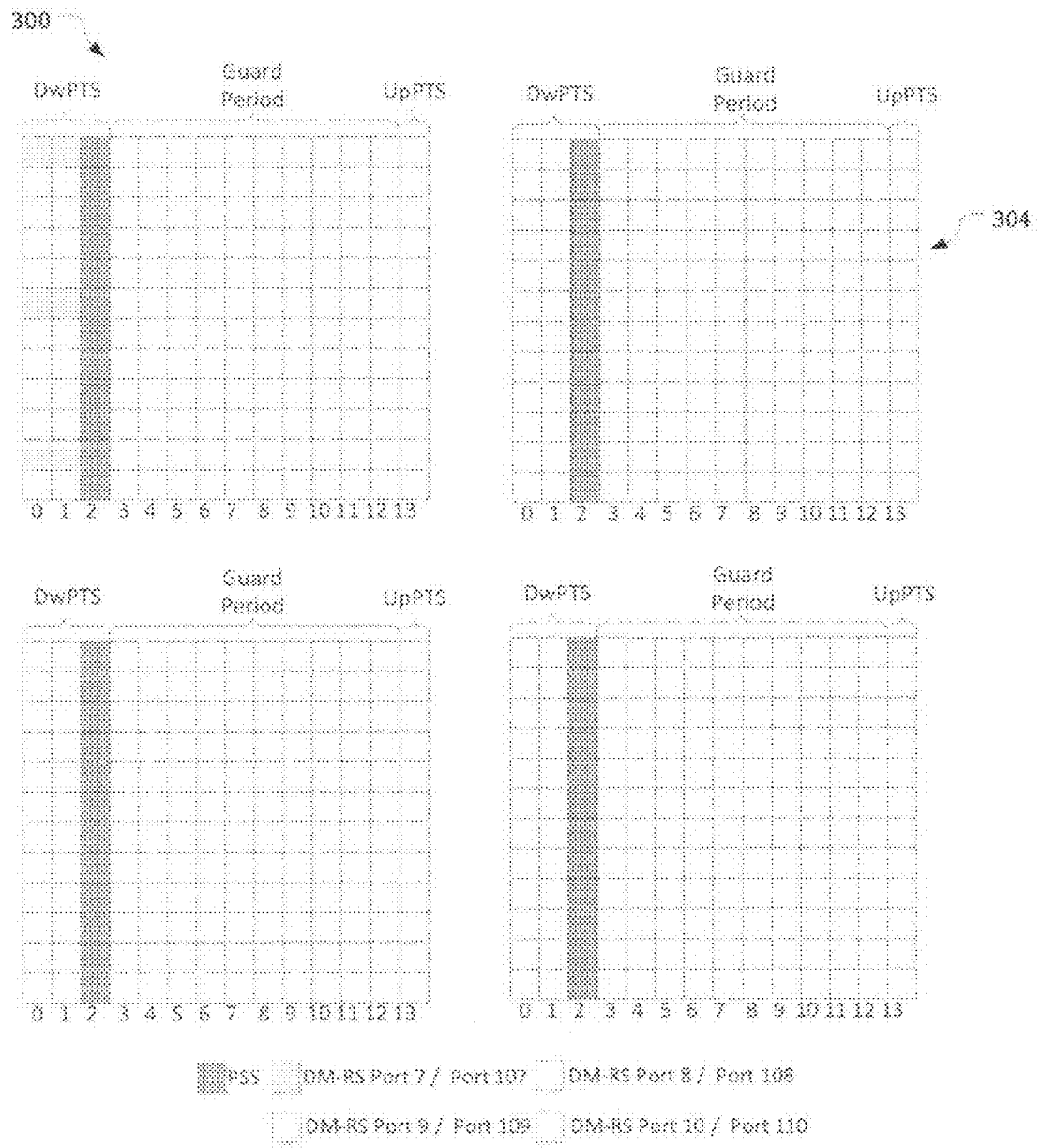
FIG. 3 illustrates a mapping pattern for a special subframe in accordance with various embodiments.

FIG. 3 illustrates an example mapping configuration 300 for transmitting DM-RSs in a special subframe 304 using four antenna ports (e.g., antenna port 7 or 107, antenna port 8 or 108, antenna port 9 or 109, and antenna port 10 or 110). Special subframe 304 shown in FIG. 3 may have a subframe configuration of 0 or 5 with a normal cyclic prefix. The special subframe 304 may include a plurality of time-domain symbols (shown with indices from 0 to 13), with each time-domain symbol including a plurality of resource elements in the frequency domain. The special subframe 304 may be one of the center 6 PRBs of the system bandwidth, and thus the special subframe 304 may include a PSS transmitted in resource elements of symbol 2 of subframe 304.

As shown in FIG. 3, The DM-RSs may be assigned to resource elements of symbols 0 and 1 of subframe 304. For example, for antenna ports, p, in a PRB with frequency-domain index $n_{PRB}$ assigned for the corresponding PDSCH transmission, a part of the DM-RS reference signal sequence r(m) may be mapped to complex-valued modulation symbols $a_{k,l}^{(p)}$ in a subframe with a normal cyclic prefix according to Equation (1):

$$a_{k,l}^{(p)} = w_p(l') \cdot r(3 \cdot l' \cdot N_{RB}^{max,DL} + 3 \cdot n_{PRB} + m') \quad (1)$$

where:

$$w_p(i) = \begin{cases} \overline{w}_p(i) & (m' + n_{PRB}) \bmod 2 = 0 \\ \overline{w}_p(3-i) & (m' + n_{PRB}) \bmod 2 = 1 \end{cases}$$

$$k = 5m' + N_{sc}^{RB} n_{PRB} + k'$$

$$k' = \begin{cases} 1 & p \in \{7, 8, 11, 13\} \\ 0 & p \in \{9, 10, 12, 14\} \end{cases}$$

$$m' = 0, 1, 2$$

The parameter, l, may have a value equal to l' mod 2, and the parameter, l', may be equal to 0,1, for a special subframe with configuration 0 or 5 that uses NCT. The values 1 and l' may have other values if other special subframe configurations are used or for subframes that are not special subframes.

The orthogonal code cover (OCC) sequence $\overline{w}_p(i)$ may be given by Table 2 below:

TABLE 2

| Antenna port p | $[\overline{w}_p(0)\ \overline{w}_p(1)\ \overline{w}_p(2)\ \overline{w}_p(3)]$ |
|---|---|
| 7 | [+1 +1 +1 +1] |
| 8 | [+1 −1 +1 −1] |
| 9 | [+1 +1 +1 +1] |
| 10 | [+1 −1 +1 −1] |
| 11 | [+1 +1 −1 −1] |
| 12 | [−1 −1 +1 +1] |
| 13 | [+1 −1 −1 +1] |
| 14 | [−1 +1 +1 −1] |

In other embodiments, in special subframes with special subframe configuration 0 or 5 with a regular cyclic prefix in the downlink, the DM-RSs may be assigned to symbols 0, 1, and 2 of the special subframe, and may be transmitted using one or two antenna ports. For example, the DM-RSs may be transmitted on antenna ports 7 and 9 or antenna ports 8 and 10, which use different resource elements and are orthogonal to one another. Thus, the UE 104 may differentiate the DM-RSs transmitted on different antenna ports. Alternatively, the DM-RSs may be transmitted on antenna ports 7 and 8 or antenna ports 9 and 10 using a discrete Fourier transform (DFT) code for orthogonal code cover (OCC) to differentiate the DM-RSs of different antenna ports. For example, the DFT code may be $$e^{j\frac{2\pi\delta i}{N}},$$

where S=0, . . . , N−1 is a code index, i=0, . . . , N−1 is a running index, and N is a code length. For example, in some embodiments, the code length N may be equal to 3, and the following three DFT codes can be used by δ=0, 1, 2, respectively:

$$[1\ 1\ 1],\ [1\ e^{j\frac{2\pi}{3}}\ e^{j\frac{4\pi}{3}}],\ [1\ e^{j\frac{4\pi}{3}}\ e^{j\frac{2\pi}{3}}]).$$

If OCC is not applied, the DM-RS may be transmitted using one antenna port. If the special subframe includes the PSS/SSS sequence (e.g., in the center six PRBs), the DM-RS may be excluded (e.g., not transmitted) from the colliding region (e.g., symbol 2).

In other embodiments including special subframes with special subframe configuration 0 or 5 with a normal cyclic prefix in the downlink, the DM-RS may be transmitted in only one symbol of the special subframe (e.g., symbol 0, symbol 1, or symbol 2). The DM-RS may be limited to one antenna port (e.g., antenna port 7 or 9), or the transmission of the DM-RS may be allowed using up to two antenna ports (e.g., antenna ports 7 and 9). For DM-RS transmitted in symbol 2, the DM-RS may not be transmitted in resource elements of a special subframe that include the PSS/SSS sequence. Accordingly, the DM-RS may not be transmitted in the special subframes of the center six PRBs.

In other embodiments including special subframes with special subframe configuration 0 or 5 with a regular cyclic prefix in the downlink, the DM-RS may be transmitted in symbol 1 and symbol 2 of the special subframe (but not symbol 0). The DM-RS may be transmitted using up to four antenna ports (e.g., antenna ports 7, 8, 9, and 10) in the special subframes. The DM-RS may not be transmitted in resource elements of a special subframe that include the PSS/SSS sequence.

For special subframes with special subframe configuration 0 or 4 with an extended cyclic prefix, the DM-RS may be assigned in a similar manner to the assignment protocol discussed above for special subframe configurations 0 and 5 with a regular cyclic prefix. However, for special subframe configurations 0 and 4 with an extended cyclic prefix, if the DM-RS is assigned to symbols 0 and 1 (but not symbol 2), or to symbols 1 and 2 (but not symbol 0), the DM-RS may be transmitted using up to two antenna ports (e.g., antenna ports 7 and 8 or 107 and 108).

For special subframes with special subframe configuration 7 using an extended cyclic prefix, in some embodiments, the mapping circuitry 148 may assign the DM-RS to time-domain symbols 0 and 1 in subcarrier positions 1, 4, 7, and 10 (e.g., in the frequency domain). The DM-RS may be transmitted using up to two antenna ports (e.g., antenna ports 7 and 8 or 107 and 108).

In other embodiments, for special subframe configuration 7 using an extended cyclic prefix, the mapping circuitry 148 may assign the DM-RS to symbols 3 and 4 in subcarrier positions 1, 4, 7, and 10. The DM-RS may be transmitted using up to two antenna ports (e.g., antenna ports 7 and 8 or 107 and 108).

In other embodiments, for special subframe configuration 7 using an extended cyclic prefix, the mapping circuitry 148 may assign the DM-RS to symbols 0, 1, 3, and 4. For example, the mapping circuitry 148 may assign the DM-RS to subcarrier positions 1, 4, 7, and 10 in time-domain symbols 0 and 1, and may assign the DM-RS to subcarrier positions 2, 5, 8, and 11 in time-domain symbols 3 and 4. The DM-RS may be transmitted using up to two antenna ports (e.g., antenna ports 7 and 8 or 107 and 108). Compared with mapping the DM-RS to either symbols 0 and 1 or symbols 3 and 4, as described above, mapping the DM-RS to symbols 0, 1, 3, and 4 may improve the accuracy and/or performance of channel estimation due to the inclusion of additional DM-RS. However, the additional DM-RS may also introduce additional overhead.

In other embodiments, for special subframe configuration 7 using an extended cyclic prefix, the mapping circuitry 148 may assign the DM-RS to time-domain symbols 1 and 2 (e.g., in subcarrier positions 1, 4, 7, and 10). The DM-RS may be limited to one antenna port (e.g., antenna port 7 or 9), or the transmission of the DM-RS may be allowed using up to two antenna ports (e.g., antenna ports 7 and 9). The DM-RS may be excluded from symbol 2 of special subframes that include the PSS/SSS sequence (e.g., in the center six PRBs).

In other embodiments, for special subframe configuration 7 using an extended cyclic prefix, the mapping circuitry 148 may assign the DM-RS to time-domain symbols 2 and 3 (e.g., in subcarrier positions 1, 4, 7, and 10). The DM-RS may be limited to one antenna port (e.g., antenna port 7 or 9), or the transmission of the DM-RS may be allowed using up to two antenna ports (e.g., antenna ports 7 and 9). The DM-RS may be excluded from symbol 2 of special subframes that include the PSS/SSS sequence (e.g., in the center six PRBs).

Alternatively or in addition to transmitting DM-RS in the special subframes with configurations in the first set of special subframe configurations, CRS may be transmitted in the special subframe to support demodulation signals transmitted from the eNB 108 to the UE 104. For example, the reference signal circuitry 152 may generate CRSs, and the mapping circuitry 148 may assign the CRSs to respective resource elements of the special subframe. The CRSs may be assigned to resource elements in the DwPTS of the special subframe responsive to a determination that the special subframe has a special subframe configuration 0 or 5 with a normal cyclic prefix or a special subframe configuration 0, 4, or 7 with an extended cyclic prefix. The transceiver circuitry 140 may transmit the CRSs to the UE 104 in the assigned resource elements. The UE 104 (e.g., the demodulation circuitry 128) may use the CRSs to demodulate signals received by the UE 104 from the eNB 108 in the DwPTS of the special subframe.

Figure 4A:
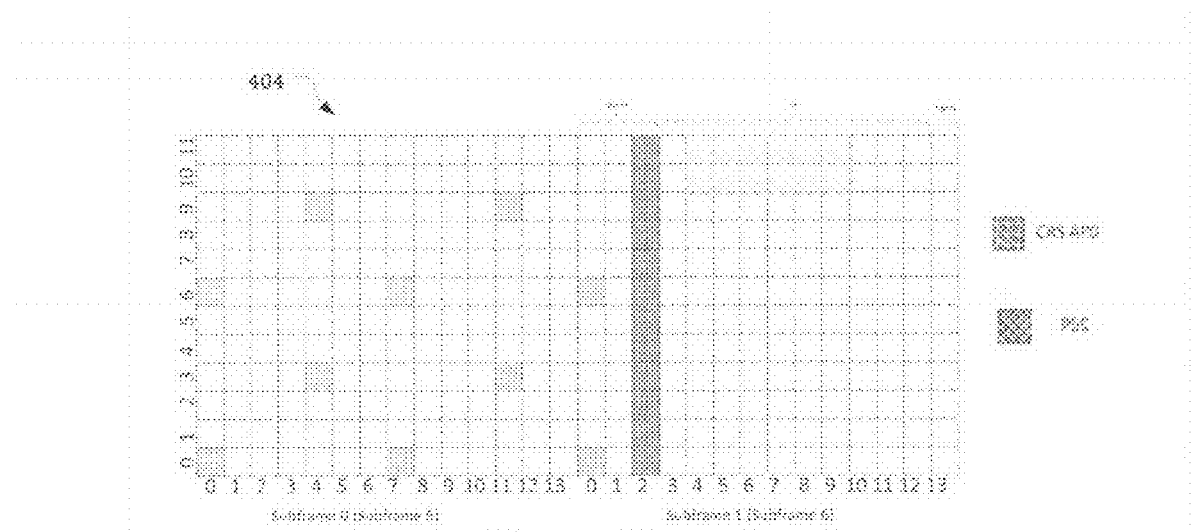
FIG. 4A illustrates a mapping pattern for a portion of a radio frame in accordance with various embodiments.

In some embodiments, the CRSs may be additionally transmitted in a non-special subframe (e.g., subframe 0), with a periodicity of 5 ms, for synchronization purposes as described above. The CRSs in the non-special subframe may be transmitted using a single antenna port (e.g., antenna port 0). In some embodiments, the CRSs in the special subframe may be transmitted using a single antenna port (e.g., antenna port 0). For example, FIG. 4A illustrates a mapping pattern 404 illustrating CRS positions in subframe 0 and subframe 1 (a special subframe including a PSS) in accordance with some embodiments. In the mapping pattern 404, the CRSs in subframe 0 and subframe 1 are transmitted using the same antenna port.

Figure 4B:
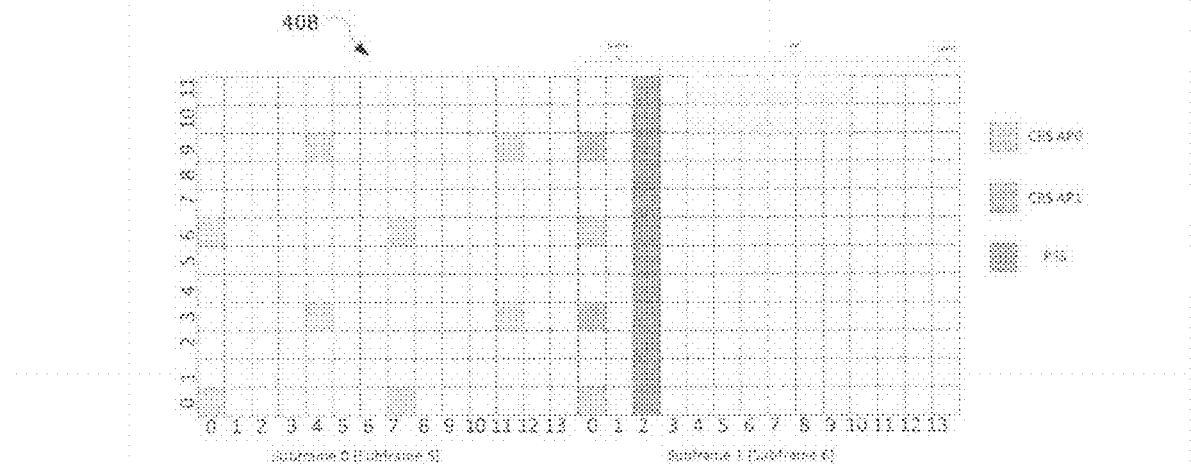
FIG. 4B illustrates another mapping pattern for a portion of a radio frame in accordance with various embodiments.

Alternatively, the CRSs in the special subframe may be transmitted using a plurality of antenna ports (e.g., two antenna ports, such as antenna port 0 and antenna port 1, or four antenna ports, such as antenna port 0, 1, 2, and 3). For example, FIG. 4B illustrates a mapping pattern 408 showing CRS positions in subframe 0 and subframe 1 (a special subframe including a PSS) in accordance with some embodiments. In the mapping pattern 408, the CRSs in subframe 0 are transmitted using a single antenna port (antenna port 0), while the CRSs in subframe 1 are transmitted using two antenna ports (antenna ports 0 and 1) in a punctured arrangement (e.g., using different resource elements).

Transmitting the CRSs using two or four antenna ports in the special subframe, as provided by mapping pattern 408, may provide robustness for the control channel transmitted therein by enabling transmit diversity schemes such as space frequency block codes (SFBCs) and/or cyclic delay diversity (CDD).

Alternatively or additionally to transmitting CRS in the DwPTS of the special subframe, in some embodiments, the UE may use the CRSs transmitted in the previous subframe to estimate the channel in the special subframe for demodulation purposes. For example, the CRSs may be transmitted in subframe 0 for synchronization. The channel estimation circuitry 124 of the UE 104 may estimate a channel between the UE 104 and the eNB 108 in the special subframe (e.g., in the DwPTS) based on the CRSs of the previous subframe (subframe 0). The demodulation circuitry 128 may use the estimated channel to demodulate signals received from the eNB 108 in the DwPTS of the special subframe.

In some embodiments, the channel estimation generated by the channel estimation circuitry 124 may also be based on the PSS/SSS sequence in the special subframe if one is transmitted in the special subframe. In some embodiments, the channel estimation circuitry 124 may estimate the channel based on the CRSs of the previous subframe responsive to a determination that the special subframe has a special subframe configuration that is included in the first group of special subframe configurations.

Figure 5:
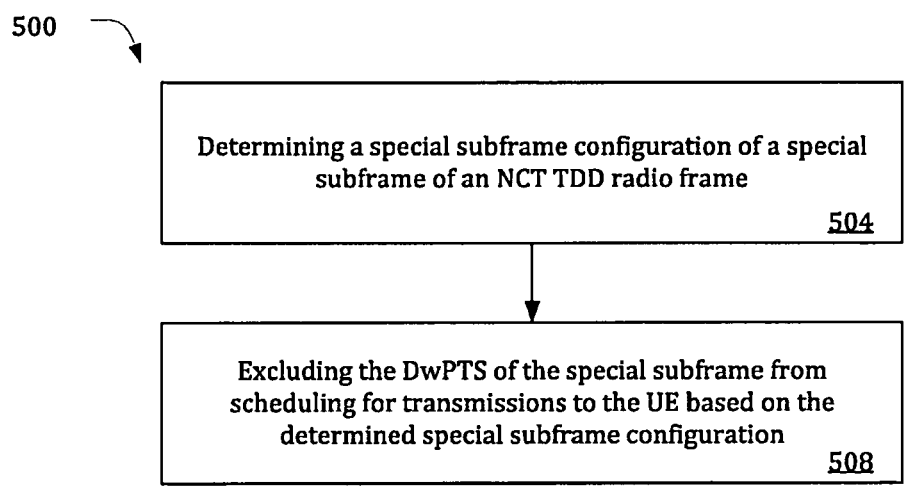
FIG. 5 illustrates a method for scheduling downlink transmissions to a UE in accordance with various embodiments.

As another alternative to the embodiments described above, in some embodiments no control channel transmissions from the eNB 108 to the UE 104 may be scheduled in the DwPTS of the special subframe if the special subframe has a special subframe configuration of 0 or 5 with a normal cyclic prefix, or special subframe configuration 0, 4, or 7 with an extended cyclic prefix. For example, FIG. 5 illustrates a method that may be performed by an eNB (e.g., eNB 108) in accordance with various embodiments. In some embodiments, the eNB may include one or more tangible computer-readable media having instructions, stored thereon, that when executed cause the eNB to perform method 500.

At 504, the method 500 may include determining a special subframe configuration of a special subframe of an NCT TDD radio frame that is to be used to communicate with a UE (e.g., UE 104).

At 508, the method 500 may include excluding the DwPTS of the special subframe from scheduling for transmissions to the UE based on the determined special subframe configuration. For example, the eNB may exclude the DwPTS of the special subframe from scheduling for transmissions to the UE if the special subframe configuration is special subframe configuration of 0 or 5 with a normal cyclic prefix, or special subframe configuration 0, 4, or 7 with an extended cyclic prefix.

In some cases, a control channel (e.g., a PDCCH or EPDCCH including a downlink scheduling assignment, an uplink grant, or semi-persistent scheduling activation or release) may be required to be transmitted in the special subframe. In this case, the corresponding control channel may be transmitted in another subframe on the same or a different serving cell. In some embodiments, the other subframe may have an index with a pre-defined difference from the index of the special subframe. For example, for a control channel on a serving cell 'c', the control channel which is supposed to be transmitted on the special subframe n may be transmitted on subframe n+a on the serving cell 'c' or another serving cell. The parameter, a, may be an integer value. The parameter, a, may be a positive number (e.g. a=1) in some embodiments, since the UE processing delay in a hybrid automatic repeat request (HARQ) round-trip may require at least four subframes. When the control channel for the special subframe is transmitted in another subframe, a relevant indication (e.g. subframe or cell index, cross-subframe indication) may be included in the control channel.

As another alternative to the embodiments described above, in some embodiments the DwPTS of the special subframe may be bundled with the resource elements of the previous subframe to form a bundled subframe. For example, subframe 0 may be combined with the DwPTS of subframe 1 to form the bundled subframe.

Figure 6:
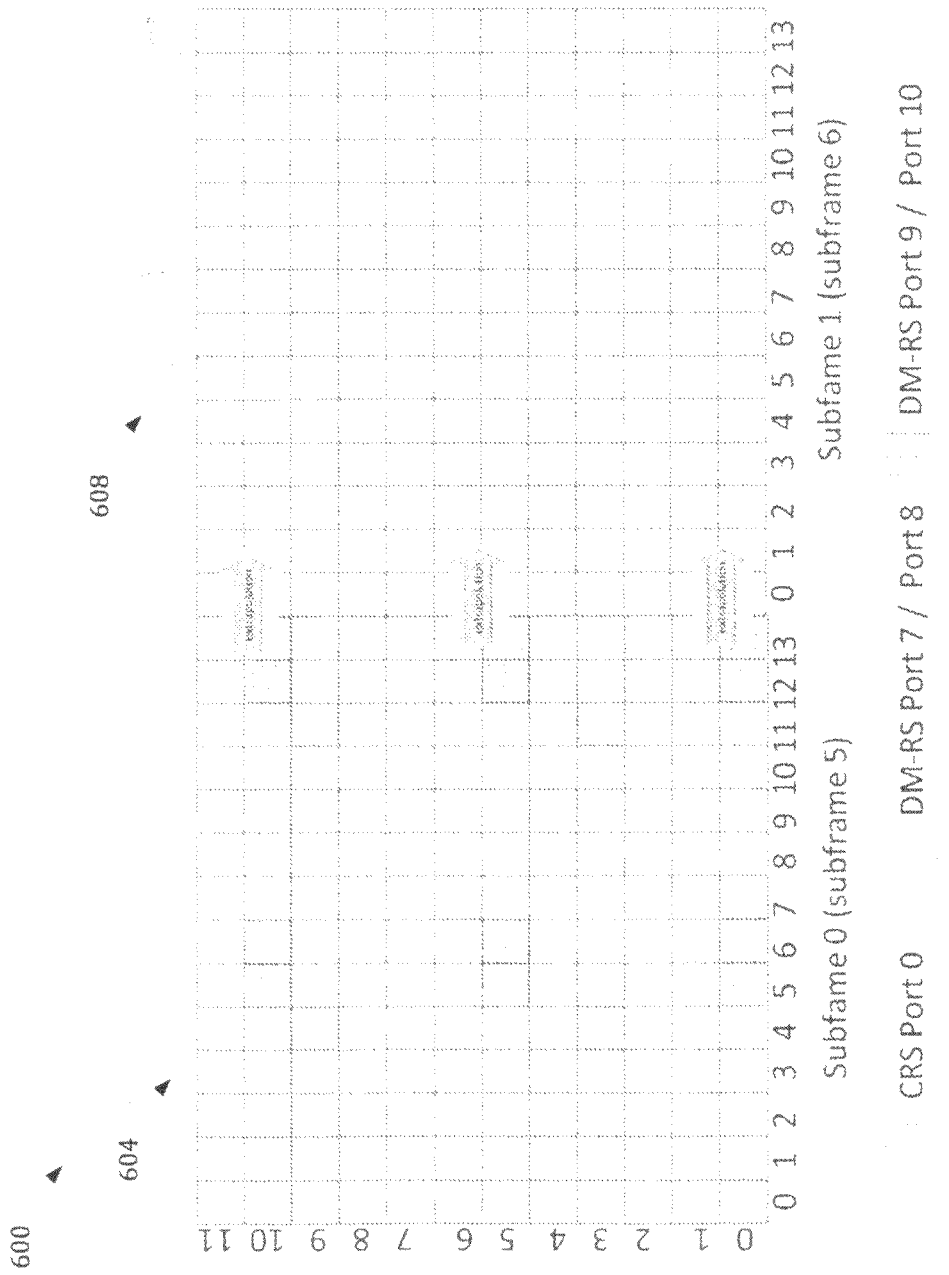
FIG. 6 illustrates a portion of a radio frame in accordance with various embodiments.

FIG. 6 illustrates a portion of a radio frame 600 including a first subframe 604 and a second subframe 608 that follows the first subframe 604. The first subframe 604 may be a downlink subframe (e.g., subframe 0 or subframe 5) and the second subframe 608 may be a special subframe (e.g., subframe 1 or subframe 6). CRS and DM-RS may be transmitted in resource elements of the first subframe 604 as shown in FIG. 6. The DM-RS is shown in FIG. 6 mapped to the first subframe 604 using two antenna ports. Other embodiments may include DM-RS transmitted using different antenna ports and/or another number of antenna ports.

The first subframe 604 and the DwPTS of the second subframe 608 may be bundled together to form a bundled subframe. The bundled subframe may be allocated to a UE by scheduling using the PDCCH, PDSCH, and/or EPDCCH located in the first subframe 604. The resource allocation and/or PDSCH-related parameters for the first subframe 604 may be applied for the second subframe 608. The resource element mapping for the first subframe 604 and the second subframe 608 may be performed as if the bundled subframe is a single subframe. The frequency-first resource element mapping may be consecutively performed for the second subframe 608 after performing it for the first subframe 604.

The bundled subframe allocated to a UE may use the same pre-coding, therefore, channel estimation and demodulation in the symbols in the DwPTS of the second subframe 608 may be performed based on the DM-RS transmission in the first subframe 604. This may also remove the PDCCH/EPDCCH overhead associated with transmission in DwPTS region.

For the center 6 PRBs, the DM-RS normally assigned to symbol 13 of the first subframe 604 may collide with the SSS transmission. In some embodiments, the DM-RS may be excluded from the colliding resource elements, and the channel estimation may be extrapolated from other DM-RSs in the first subframe 604.

In some embodiments, if an uplink grant is supposed to be transmitted in the special subframe, the corresponding uplink grant transmission may be delayed to a later subframe (e.g. the next available subframe).

Figure 7:
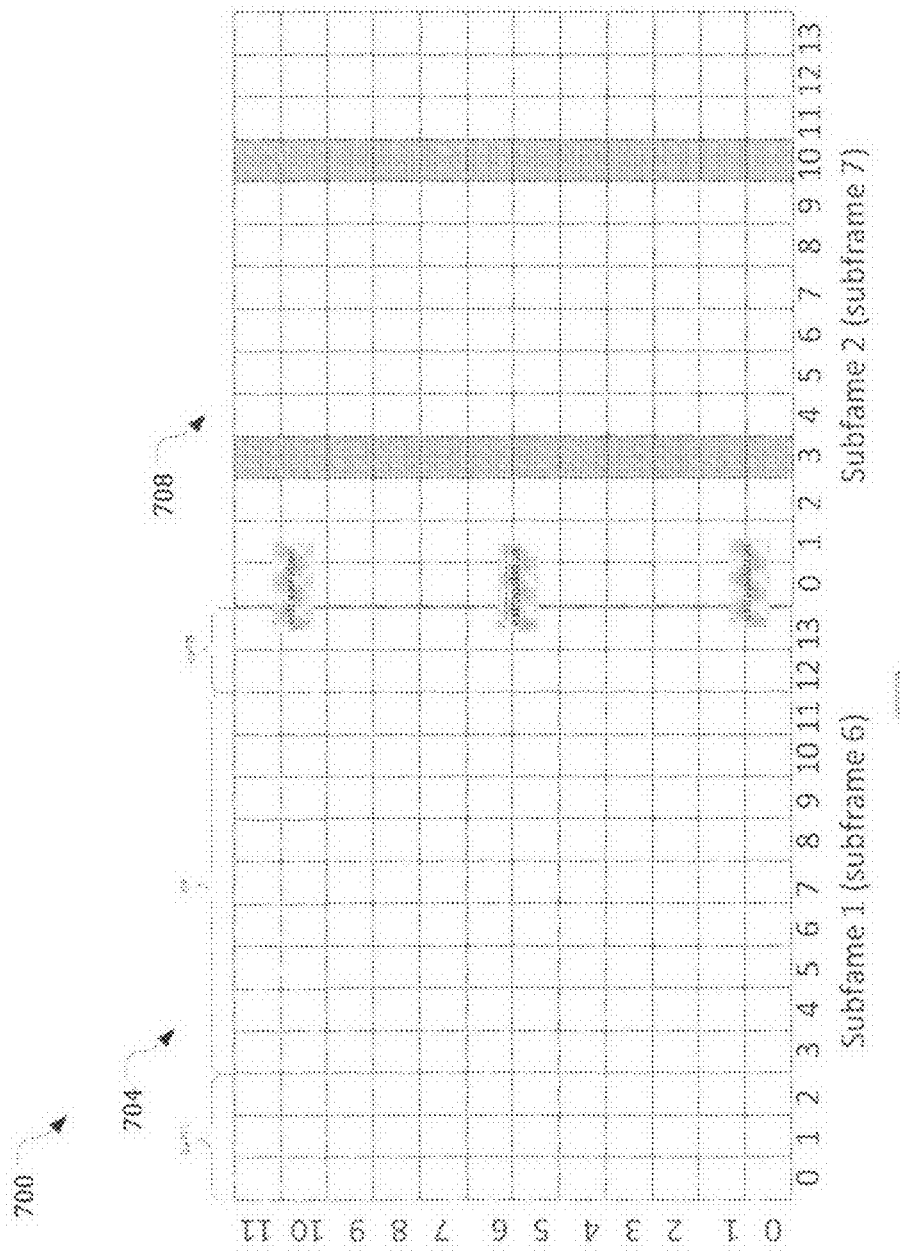
FIG. 7 illustrates a portion of a radio frame in accordance with various embodiments.

In some embodiments, the UpPTS of the special subframe may be bundled with the resource elements of the following uplink subframe (e.g., subframe 2) in a similar manner to the bundling of the DwPTS described above. For example, FIG. 7 illustrates a portion of a radio frame 700 including a special subframe 704 and an uplink subframe 708 in accordance with various embodiments. For example, special subframe 704 may be subframe 1 or subframe 6, and the uplink subframe 708 may be subframe 2 or subframe 7, respectively. The UpPTS of the special subframe 704 may be bundled with the resource elements of the uplink subframe 708 to form a bundled subframe. The bundled subframe may be used for uplink data transmission (e.g., on a physical uplink shared channel (PUSCH)). Channel estimation in the UpPTS of the special subframe 704 may be performed using uplink DM-RSs transmitted in the uplink subframe 708.

In other embodiments, the bundled subframe may be used for transmission of uplink control information (e.g., a physical uplink control channel (PUCCH)). For an uplink control channel, the mapping of uplink DM-RS may be transmitted with a different mapping pattern from that shown in FIG. 7. In some embodiments, a length 6 or length 7 spreading sequence (e.g., a DFT sequence) may be applied for the data in slot 0 of the bundled subframe.

In some embodiments, the bundling of the DwPTS and/or UpPTS with resource elements of another subframe may not be limited to specific special subframe configurations or to NCT communications. Rather, the bundling of DwPTS and/or UpPTS described herein may be used with any special subframe configuration and/or with any suitable carrier type.

Figure 8:
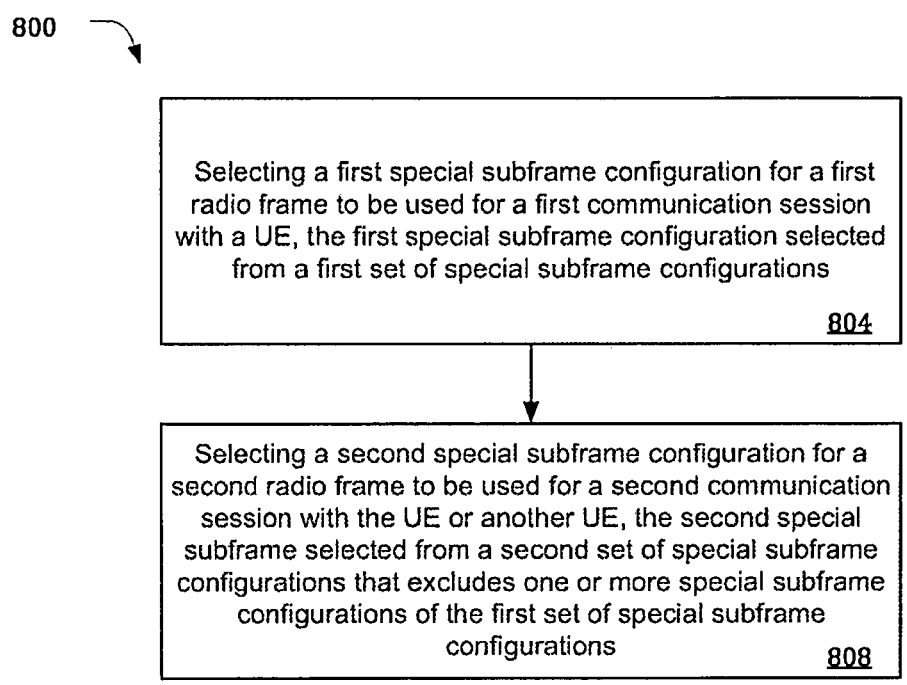
FIG. 8 illustrates a method for selecting a special subframe configuration for a radio frame that may be performed by an eNB in accordance with various embodiments.

In another alternative embodiment to those described above, some special subframe configurations may be excluded from use when NCT TDD communications are used. For example, FIG. 8 illustrates a method 800 that may be performed by an eNB (e.g., eNB 108) in accordance with various embodiments. In some embodiments, the eNB may include one or more tangible computer-readable media having instructions, stored thereon, that when executed cause the eNB to perform method 800.

At 804, the method 800 may include selecting a first special subframe configuration for a first carrier to be used for a first communication session with a UE. The first special subframe configuration may be selected from a first set of special subframe configurations. For example, the first set of special subframe configurations may include special subframe configurations 0 to 8 with a normal cyclic prefix and special subframe configurations 0 to 7 with an extended cyclic prefix.

At 808, the method 800 may further include selecting a second special subframe configuration for a second carrier to be used for a second communication session with the UE or another UE. The second special subframe may be selected from a second set of special subframe configurations that excludes one or more special subframe configurations of the first set of special subframe configurations. For example, the second set of special subframe configurations may be a subset of less than all configurations of the first set of special subframe configurations.

In some embodiments, the second set may exclude one or more configurations of the first set that have the shortest DwPTS of the first set of special subframe configurations. For example, the DwPTS of the excluded special subframe configurations may be shorter than the DwPTS of any of the special subframe configurations included in the second set of special subframe configurations. The excluded special subframe configurations may further include a longer guard period than the special subframe configurations included in the second set of special subframe configurations.

In some embodiments, the special subframe configurations of the first set of special subframe configurations that are excluded from the second set of special subframe configurations may include special subframe configuration 0 with a normal cyclic prefix, special subframe configuration 5 with a normal cyclic prefix, special subframe configuration 0 with an extended cyclic prefix, and/or special subframe configuration 4 with an extended cyclic prefix. In some embodiments, special subframe configuration 7 with an extended cyclic prefix may additionally be included in the first set and excluded from the second set of special subframe configurations.

Although several alternative embodiments are described herein, it will be appreciated that the described embodiments are not mutually exclusive. Rather, in some cases, a plurality of the embodiments may be practiced in combination with one another. Additionally, or alternatively, one embodiment may be practiced with respect to one special subframe configuration while another embodiment may be practiced with respect to another special subframe configuration.

Figure 9:
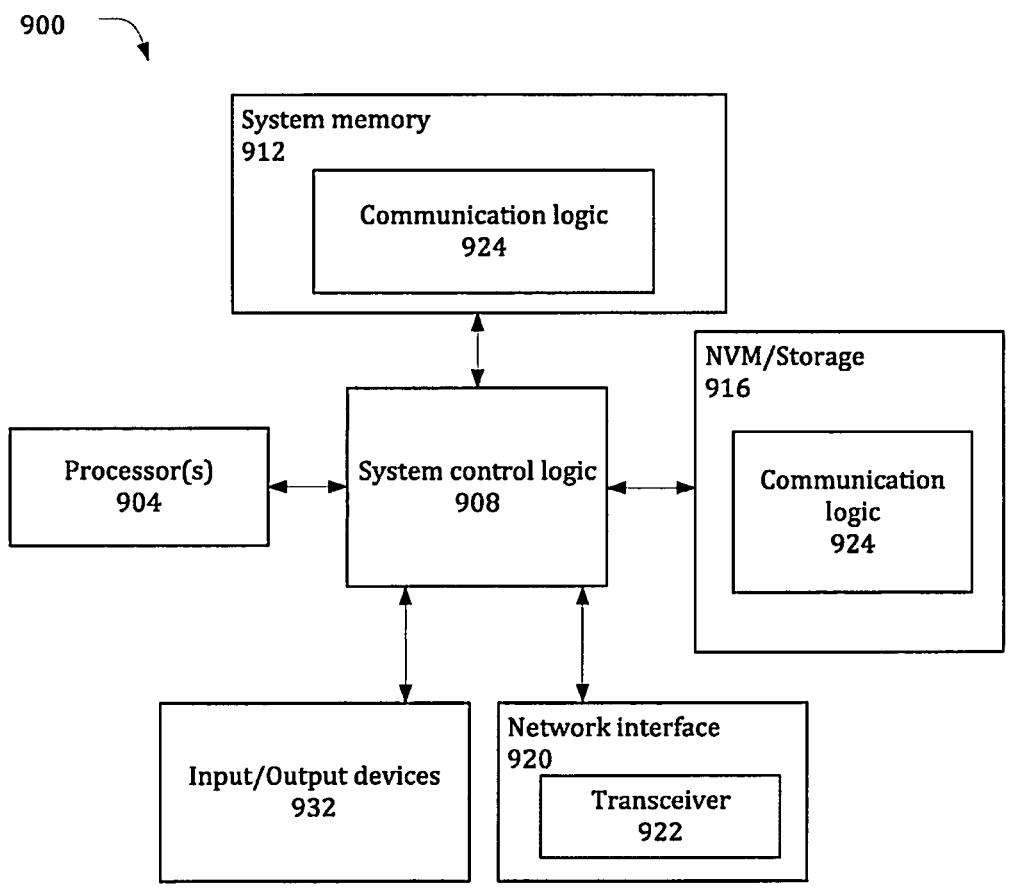
FIG. 9 schematically illustrates an example system that may be used to practice various embodiments described herein.

The UE 104 and eNB 108 described herein may be implemented into a system using any suitable hardware and/or software to configure as desired. FIG. 9 illustrates, for one embodiment, an example system 900 comprising one or more processor(s) 904, system control logic 908 coupled with at least one of the processor(s) 904, system memory 912 coupled with system control logic 908, non-volatile memory (NVM)/storage 916 coupled with system control logic 908, a network interface 920 coupled with system control logic 908, and input/output (I/O) devices 932 coupled with system control logic 908.

The processor(s) 904 may include one or more single-core or multi-core processors. The processor(s) 904 may include any combination of general-purpose processors and dedicated processors (e.g., graphics processors, application processors, baseband processors, etc.).

System control logic 908 for one embodiment may include any suitable interface controllers to provide for any suitable interface to at least one of the processor(s) 904 and/or to any suitable device or component in communication with system control logic 908.

System control logic 908 for one embodiment may include one or more memory controller(s) to provide an interface to system memory 912. System memory 912 may be used to load and store data and/or instructions, e.g., communication logic 924. System memory 912 for one embodiment may include any suitable volatile memory, such as suitable dynamic random access memory (DRAM), for example.

NVM/storage 916 may include one or more tangible, non-transitory computer-readable media used to store data and/or instructions, e.g., communication logic 924. NVM/storage 916 may include any suitable non-volatile memory, such as flash memory, for example, and/or may include any suitable non-volatile storage device(s), such as one or more hard disk drive(s) (HDD(s)), one or more compact disk (CD) drive(s), and/or one or more digital versatile disk (DVD) drive(s), for example.

The NVM/storage 916 may include a storage resource physically part of a device on which the system 900 is installed or it may be accessible by, but not necessarily a part of, the device. For example, the NVM/storage 916 may be accessed over a network via the network interface 920 and/or over Input/Output (I/O) devices 932.

The communication logic 924 may include instructions that, when executed by one or more of the processors 904, cause the system 900 to perform operations associated with the components of the communication device 112 or 136 as described with respect to the above embodiments. In various embodiments, the communication logic 924 may include hardware, software, and/or firmware components that may or may not be explicitly shown in system 900.

Network interface 920 may have a transceiver 922 to provide a radio interface for system 900 to communicate over one or more network(s) and/or with any other suitable device. In various embodiments, the transceiver 922 may be integrated with other components of system 900. For example, the transceiver 922 may include a processor of the processor(s) 904, memory of the system memory 912, and NVM/Storage of NVM/Storage 916. Network interface 920 may include any suitable hardware and/or firmware. Network interface 920 may include a plurality of antennas to provide a multiple input, multiple output radio interface. Network interface 920 for one embodiment may include, for example, a wired network adapter, a wireless network adapter, a telephone modem, and/or a wireless modem.

For one embodiment, at least one of the processor(s) 904 may be packaged together with logic for one or more controller(s) of system control logic 908. For one embodiment, at least one of the processor(s) 904 may be packaged together with logic for one or more controllers of system control logic 908 to form a System in Package (SiP). For one embodiment, at least one of the processor(s) 904 may be integrated on the same die with logic for one or more controller(s) of system control logic 908. For one embodiment, at least one of the processor(s) 904 may be integrated on the same die with logic for one or more controller(s) of system control logic 908 to form a System on Chip (SoC).

In various embodiments, the I/O devices 932 may include user interfaces designed to enable user interaction with the system 900, peripheral component interfaces designed to enable peripheral component interaction with the system 900, and/or sensors designed to determine environmental conditions and/or location information related to the system 900.

In various embodiments, the user interfaces could include, but are not limited to, a display (e.g., a liquid crystal display, a touch screen display, etc.), speakers, a microphone, one or more cameras (e.g., a still camera and/or a video camera), a flashlight (e.g., a light emitting diode flash), and a keyboard.

In various embodiments, the peripheral component interfaces may include, but are not limited to, a non-volatile memory port, a universal serial bus (USB) port, an audio jack, an Ethernet connection, and a power supply interface.

In various embodiments, the sensors may include, but are not limited to, a gyro sensor, an accelerometer, a proximity sensor, an ambient light sensor, and a positioning unit. The positioning unit may also be part of, or interact with, the network interface 920 to communicate with components of a positioning network, e.g., a global positioning system (GPS) satellite.

In various embodiments, the system 900 may be a mobile computing device such as, but not limited to, a laptop computing device, a tablet computing device, a netbook, a smartphone, etc. In various embodiments, system 900 may have more or less components, and/or different architectures.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

Some non-limiting examples are provided below.

Example 1 includes an apparatus to be employed by an evolved Node B (eNB), the apparatus comprising: reference signal circuitry to generate demodulation reference signals (DM-RSs) to facilitate a user equipment (UE) to receive signals from the eNB; mapping circuitry to assign the DM-RSs to resource elements of a downlink pilot time slot (DwPTS) of a time-domain duplexing (TDD) special subframe based on a configuration of the TDD special subframe, wherein the configuration of the TDD special subframe is a special subframe configuration 0 with a normal cyclic prefix, a special subframe configuration 5 with a normal cyclic prefix, a special subframe configuration 0 with an extended cyclic prefix, a special subframe configuration 4 with an extended cyclic prefix, or a special sub-frame configuration 7 with an extended cyclic prefix; and transceiver circuitry to wirelessly transmit the DM-RSs to the UE using the assigned resource elements to facilitate the UE to receive a transmission from the eNB in the DwPTS.

Example 2 includes the apparatus of Example 1, wherein the mapping circuitry is to assign the DM-RSs to resource elements in an earliest three time-domain symbols of the TDD special subframe.

Example 3 includes the apparatus of Example 2, wherein the mapping circuitry is to assign the DM-RSs to resource elements in an earliest and a second earliest time-domain symbol of the TDD special subframe.

Example 4 includes the apparatus of Example 3, wherein the transceiver circuitry is to transmit the DM-RSs using four antenna ports.

Example 5 includes the apparatus of Example 1, wherein the TDD special subframe is a first TDD special subframe that does not include a primary synchronization signal (PSS) or a secondary synchronization signal (SSS), and wherein the mapping circuitry is to assign one or more of the DM-RSs to resource elements in a third earliest time-domain symbol of the first TDD special subframe, and wherein the mapping circuitry is further to exclude the DM-RSs from a third earliest symbol of a second TDD special subframe that includes a PSS or an SSS.

Example 6 includes the apparatus of Example 1, wherein the DwPTS of the TDD special subframe has a length of less than 420 microseconds.

Example 7 includes the apparatus of any one of Examples 1 to 6, wherein the mapping circuitry is further to assign the DM-RSs to the resource elements of the DwPTS based on a determination that the TDD special subframe has a new carrier type (NCT) format.

Example 8 includes the apparatus of any one of Examples 1 to 6, wherein the transceiver circuitry is to transmit the DM-RSs using a plurality of antenna ports, wherein the DM-RSs transmitted on different antenna ports are transmitted using different density functional theory (DFT) codes.

Example 9 includes an apparatus to be employed by an evolved Node B (eNB), the apparatus comprising: reference signal circuitry to generate cell-specific reference signals (CRSs); mapping circuitry to assign the CRSs to resource elements within a new carrier type (NCT) radio frame in which the CRSs are not transmitted in every subframe of the radio frame, the mapping circuitry to assign the CRSs to one or more resource elements of a downlink pilot time slot (DwPTS) of a special subframe of the radio frame, the special subframe including the DwPTS, an uplink pilot time slot (UpPTS), and a guard period between the DwPTS and the UpPTS; and transceiver circuitry to wirelessly transmit the CRSs to a user equipment (UE) in the assigned resource elements to facilitate demodulation of signals transmitted from the eNB to the UE in the DwPTS of the special subframe.

Example 10 includes the apparatus of Example 9, wherein a demodulation reference signal (DM-RS) is not transmitted in the special subframe.

Example 11 includes the apparatus of Example 9 or Example 10, wherein the mapping circuitry is further to assign the CRSs to one or more resource elements of a downlink subframe.

Example 12 includes the apparatus of Example 11, wherein the transceiver circuitry is to transmit the CRSs in the downlink subframe with a same antenna port, and to transmit the CRSs in the special subframe with a plurality of antenna ports.

Example 13 includes the apparatus of Example 11, wherein the mapping circuitry is further to exclude the CRSs from another downlink subframe of the radio frame.

Example 14 includes an apparatus to be employed by a user equipment (UE), the apparatus comprising: transceiver circuitry to communicate signals with an evolved Node B (eNB) using a new carrier type (NCT) radio frame having a plurality of subframes including a first subframe and a special subframe following the first subframe, wherein the transceiver circuitry is further to transmit a plurality of cell-specific reference signals (CRSs) in the first subframe; channel estimation circuitry to estimate a channel between the UE and the eNB in a downlink pilot time slot (DwPTS) of the special subframe based on the CRSs in the first subframe; and demodulation circuitry to demodulate a transmission received in the DwPTS of the special subframe based on the estimated channel.

Example 15 includes the apparatus of Example 14, wherein the transceiver circuitry is to transmit the CRSs with a periodicity of 5 sub-frames.

Example 16 includes the apparatus of Example 14, wherein the channel estimation circuitry is to estimate the channel in the special subframe based on the CRSs in the first subframe responsive to a determination that the special subframe has a special subframe configuration 0 or a special subframe configuration 5 with a normal cyclic prefix, or a special subframe configuration 0, a special sub-frame configuration 4, or a special subframe configuration 7 with an extended cyclic prefix.

Example 17 includes the apparatus of any one of Examples 14 to 16, wherein the transceiver circuitry is to transmit a synchronization signal in the DwPTS of the special subframe, and wherein the channel estimation circuitry is to estimate the channel between the UE and the eNB in the DwPTS of the special subframe based on the CRSs of the first subframe and the synchronization signal in the special subframe.

Example 18 includes one or more non-transitory computer readable media having instructions, stored thereon, that when executed cause an evolved Node B (eNB) to: determine a special subframe configuration of a special subframe of a new carrier type (NCT) time domain duplexing (TDD) radio frame, the special subframe including a downlink pilot time slot (DwPTS) and an uplink pilot time slot (UpPTS) separated by a guard period; and exclude the DwPTS of the special subframe from scheduling of transmissions to a user equipment (UE) based on the determined special subframe configuration.

Example 19 includes the one or more media of Example 18, wherein the special subframe configuration is a special subframe configuration 0 or a special subframe configuration 5 with a normal cyclic prefix, or a special subframe configuration 0, a special subframe configuration 4, or a special subframe configuration 7 with an extended cyclic prefix.

Example 20 includes the one or more media of Example 18, wherein the instructions, when executed, further cause the eNB to: transmit a control channel associated with the special subframe in another subframe on a same serving cell that is associated with the DwPTS of the special subframe or on a different serving cell.

Example 21 includes the one or more media of Example 20, wherein the other subframe has an index that has a pre-defined difference from an index of the special subframe.

Example 22 includes an apparatus to be employed by an evolved Node B (eNB), the apparatus comprising: transceiver circuitry to communicate with a user equipment (UE) in a radio frame having a plurality of subframes, the plurality of subframes including a special subframe having a downlink pilot time slot (DwPTS), a guard period, and an uplink pilot time slot (UpPTS); and scheduling circuitry coupled to the transceiver circuitry. The scheduling circuitry is to: bundle the DwPTS or the UpPTS of the special subframe with another subframe that precedes or follows the special sub-frame; and schedule a communication between the UE and the eNB in the bundled subframe using a same scheduling transmission.

Example 23 includes the apparatus of Example 22, wherein the DwPTS of the special sub-frame is bundled with the other subframe, and wherein the other subframe precedes the special subframe.

Example 24 includes the apparatus of Example 23, wherein the DwPTS of the special subframe has a length of three time-domain symbols.

Example 25 includes the apparatus of Example 23, wherein the transceiver circuitry is to transmit a demodulation reference signal (DM-RS) in the other subframe to facilitate demodulation of the communication in the DwPTS of the special subframe.

Example 26 includes the apparatus of Example 22, wherein the UpPTS of the special subframe is bundled with the other subframe, and wherein the other subframe follows the special subframe.

Example 27 includes a method for selecting subframe configurations to be performed by an evolved Node B (eNB), the method comprising: selecting a first special subframe configuration for a first radio frame to be used for a first communication session with a user equipment (UE), the first radio frame having a first carrier type in which a cell-specific reference signal (CRS) is included in each downlink subframe of the first radio frame, wherein the first radio frame includes a first special subframe having a downlink pilot time slot (DwPTS) and an uplink pilot time slot (UpPTS) separated by a guard period, wherein a length of the DwPTS in the first special subframe is based on the first special subframe configuration, and wherein the first special subframe configuration is selected from a first set of a plurality of special subframe configurations; and selecting a second special subframe configuration for a second radio frame to be used for a second communication session with the UE or another UE, the second radio frame having a new carrier type (NCT) in which a CRS is transmitted with a periodicity of greater than one subframe, wherein the second special subframe configuration is selected from a second set of a plurality of special subframe configurations, wherein one or more of the special subframe configurations of the first set are excluded from the second set.

Example 28 includes the method of Example 27, wherein the second group excludes a first configuration of the first group that has a shortest DwPTS of the first group of configurations.

Example 29 includes the method of Example 28, wherein the first configuration includes a longer guard period than other configurations of the first group.

Example 30 includes the method of Example 27, wherein the one or more special subframe configurations of the first group that are excluded from the second group include a special sub-frame configuration 0 with a normal cyclic prefix, a special sub-frame configuration 5 with a normal cyclic prefix, a special sub-frame configuration 0 with an extended cyclic prefix, and a special sub-frame configuration 4 with an extended cyclic prefix.

Example 31 includes an apparatus to be employed by an evolved Node B (eNB), the apparatus comprising: means for determining a special subframe configuration of a special subframe of a new carrier type (NCT) time domain duplexing (TDD) radio frame, the special subframe including a downlink pilot time slot (DwPTS) and an uplink pilot time slot (UpPTS) separated by a guard period; and means for excluding the DwPTS of the special subframe from scheduling of transmissions to a user equipment (UE) based on the determined special subframe configuration.

Example 32 includes the apparatus of Example 31, wherein the special subframe configuration is a special subframe configuration 0 or a special subframe configuration 5 with a normal cyclic prefix, or a special subframe configuration 0, a special subframe configuration 4, or a special subframe configuration 7 with an extended cyclic prefix.

Example 33 includes the apparatus of Example 31, further comprising: means for transmitting a control channel associated with the special subframe in another subframe on a same serving cell that is associated with the DwPTS of the special subframe or on a different serving cell.

Example 34 includes the apparatus of Example 33, wherein the other subframe has an index that has a predefined difference from an index of the special sub-frame.

What is claimed is:

1. An apparatus to be employed by an evolved Node B (eNB), the apparatus comprising:
reference signal circuitry to generate demodulation reference signals (DM-RSs) to facilitate a user equipment (UE) to receive signals from the eNB;
mapping circuitry to assign the DM-RSs to resource elements of a downlink pilot time slot (DwPTS) of a time-domain duplexing (TDD) special subframe based on a configuration of the TDD special subframe, wherein the configuration of the TDD special subframe is a special subframe configuration 0 with a normal cyclic prefix, a special subframe configuration 5 with a normal cyclic prefix, a special subframe configuration 0 with an extended cyclic prefix, a special subframe configuration 4 with an extended cyclic prefix, or a special sub-frame configuration 7 with an extended cyclic prefix; and
transceiver circuitry to wirelessly transmit the DM-RSs to the UE using the assigned resource elements to facilitate the UE to receive a transmission from the eNB in the DwPTS;
wherein the TDD special subframe is a first TDD special subframe that does not include a primary synchronization signal (PSS) or a secondary synchronization signal (SSS), and wherein the mapping circuitry is to assign one or more of the DM-RSs to resource elements in a third earliest time-domain symbol of the first TDD special subframe, and wherein the mapping circuitry is further to exclude the DM-RSs from a third earliest symbol of a second TDD special subframe that includes a PSS or an SSS..

2. The apparatus of claim 1, wherein the mapping circuitry is to assign the DM-RSs to resource elements in an earliest three time-domain symbols of the TDD special subframe.

3. The apparatus of claim 2, wherein the mapping circuitry is to assign the DM-RSs to resource elements in an earliest and a second earliest time-domain symbol of the TDD special subframe.

4. The apparatus of claim 3, wherein the transceiver circuitry is to transmit the DM-RSs using four antenna ports.

5. The apparatus of claim 1, wherein the DwPTS of the TDD special subframe has a length of less than 420 microseconds.

6. The apparatus of claim 1, wherein the mapping circuitry is further to assign the DM-RSs to the resource elements of the DwPTS based on a determination that the TDD special subframe has a new carrier type (NCT) format.

7. The apparatus of claim 1, wherein the transceiver circuitry is to transmit the DM-RSs using a plurality of antenna ports, wherein the DM-RSs transmitted on different antenna ports are transmitted using different discrete Fourier transform (DFT) codes.

8. An apparatus to be employed by an evolved Node B (eNB), the apparatus comprising:

reference signal circuitry to generate cell-specific reference signals (CRSs);

mapping circuitry to assign the CRSs to resource elements within a new carrier type (NCT) radio frame in which the CRSs are not transmitted in every subframe of the radio frame, the mapping circuitry to assign the CRSs to one or more resource elements of a downlink pilot time slot (DwPTS) of a special subframe of the radio frame, the special subframe including the DwPTS, an uplink pilot time slot (UpPTS), and a guard period between the DwPTS and the UpPTS, wherein a demodulation reference signal (DM-RS) is transmitted in other subframes of the radio frame and is not transmitted in the special subframe; and transceiver circuitry to wirelessly transmit the CRSs to a user equipment (UE) in the assigned resource elements to facilitate demodulation of signals transmitted from the eNB to the UE in the DwPTS of the special subframe.

9. The apparatus of claim 8, wherein the mapping circuitry is further to assign the CRSs to one or more resource elements of a downlink subframe.

10. The apparatus of claim 9, wherein the transceiver circuitry is to transmit the CRSs in the downlink subframe with a same antenna port, and to transmit the CRSs in the special subframe with a plurality of antenna ports.

11. The apparatus of claim 9, wherein the mapping circuitry is further to exclude the CRSs from another downlink subframe of the radio frame.

12. An apparatus to be employed by a user equipment (UE), the apparatus comprising:

transceiver circuitry to communicate signals with an evolved Node B (eNB) using a new carrier type (NCT) radio frame having a plurality of subframes including a first subframe and a special subframe following the first subframe, wherein the transceiver circuitry is further to transmit a plurality of cell-specific reference signals (CRSs) in the first subframe;

channel estimation circuitry to estimate a channel between the UE and the eNB in a downlink pilot time slot (DwPTS) of the special subframe based on the CRSs in the first subframe, wherein the channel estimation circuitry is to estimate the channel in the special subframe based on the CRSs in the first subframe responsive to a determination that the special subframe has a special subframe configuration 0 or a special subframe configuration 5 with a normal cyclic prefix, or a special subframe configuration 0, a special subframe configuration 4, or a special subframe configuration 7 with an extended cyclic prefix; and demodulation circuitry to demodulate a transmission received in the DwPTS of the special subframe based on the estimated channel.

13. The apparatus of claim 12, wherein the transceiver circuitry is to transmit the CRSs with a periodicity of 5 sub-frames.

14. An apparatus to be employed by a user equipment (UE), the apparatus comprising:

transceiver circuitry to communicate signals with an evolved Node B (eNB) using a new carrier type (NCT) radio frame having a plurality of subframes including a first subframe and a special subframe following the first subframe, wherein the transceiver circuitry is further to transmit a plurality of cell-specific reference signals (CRSs) in the first subframe;

channel estimation circuitry to estimate a channel between the UE and the eNB in a downlink pilot time slot (DwPTS) of the special subframe based on the CRSs in the first subframe; and demodulation circuitry to demodulate a transmission received in the DwPTS of the special subframe based on the estimated channel;

wherein the transceiver circuitry is to transmit a synchronization signal in the DwPTS of the special subframe, and wherein the channel estimation circuitry is to estimate the channel between the UE and the eNB in the DwPTS of the special subframe based on the CRSs of the first subframe and the synchronization signal in the special subframe.

15. An apparatus to be employed by an evolved Node B (eNB), the apparatus comprising:

transceiver circuitry to communicate with a user equipment (UE) in a radio frame having a plurality of subframes, the plurality of subframes including a special subframe having a downlink pilot time slot (DwPTS), a guard period, and an uplink pilot time slot (UpPTS); and scheduling circuitry coupled to the transceiver circuitry, the scheduling circuitry to:
bundle the UpPTS of the special subframe with another subframe that follows the special sub-frame; and
schedule a communication between the UE and the eNB in the bundled subframe using a same scheduling transmission.

* * * * *